United States Patent
Termini et al.

(10) Patent No.: US 11,362,574 B2
(45) Date of Patent: Jun. 14, 2022

(54) ROTOR FOR ROTATING ELECTRIC MACHINES HAVING FLUX BARRIERS ARRANGED AMONG BRIDGES

(71) Applicant: ABB Schweiz AG, Baden (CH)

(72) Inventors: Pietro Savio Termini, Vittuone (IT); Alessandro Castagnini, Novara (IT); Giovanni Tartaglino, Vittuone (IT); Michele Maggi, Vittuone (IT); Jere Kolehmainen, Vaasa (FI); Tero Kansakangas, Vaasa (FI)

(73) Assignee: ABB Schweiz AG, Baden (CH)

( * ) Notice: Subject to any disclaimer, the term of this patent is extended or adjusted under 35 U.S.C. 154(b) by 35 days.

(21) Appl. No.: 16/471,948

(22) PCT Filed: Dec. 21, 2016

(86) PCT No.: PCT/EP2016/082242
§ 371 (c)(1),
(2) Date: Jun. 20, 2019

(87) PCT Pub. No.: WO2018/113961
PCT Pub. Date: Jun. 28, 2018

(65) Prior Publication Data
US 2019/0319522 A1 Oct. 17, 2019

(51) Int. Cl.
*H02K 21/46* (2006.01)
*H02K 1/22* (2006.01)
(Continued)

(52) U.S. Cl.
CPC ............... *H02K 21/46* (2013.01); *H02K 1/22* (2013.01); *H02K 1/223* (2013.01); *H02K 1/27* (2013.01); *H02K 1/2766* (2013.01)

(58) Field of Classification Search
CPC ....... H02K 1/223; H02K 1/2766; H02K 21/46
(Continued)

(56) References Cited

U.S. PATENT DOCUMENTS

| 2003/0111927 A1 | 6/2003 | Takita | |
| 2007/0152527 A1* | 7/2007 | Yura | H02K 1/246 |
| | | | 310/156.53 |

(Continued)

FOREIGN PATENT DOCUMENTS

| DE | 102014215304 A1 | 2/2016 |
| EP | 3082225 A1 | 10/2016 |

(Continued)

OTHER PUBLICATIONS

Gontermann et al, English Machine Translation of DE 102014215304 (Year: 2016).*

(Continued)

*Primary Examiner* — Rashad H Johnson
(74) *Attorney, Agent, or Firm* — Armstrong Teasdale LLP

(57) ABSTRACT

A rotor for a synchronous reluctance machine includes a rotor core having a plurality of magnetically conductive laminations stacked in a rotor axial direction. The magnetically conductive laminations include cut-out portions forming a plurality of flux barriers radially alternated by flux paths portions, where at least one of the flux barriers includes a ridge connecting two flux paths portions adjacent to the at least one flux barrier. The at least one flux barrier has a first barrier mid-line, which is a line that is equidistant from both sides of the at least one flux barrier. The bridge has a second bridge mid-line, which is the line that is equidistant from both sides of the bridge. The first and second mid-lines intersect. The bridge has a first and second symmetry axis and is non-symmetrical with respect to at least one of the first and second symmetry axis.

16 Claims, 3 Drawing Sheets

(51) Int. Cl.
   *H02K 1/276* (2022.01)
   *H02K 1/27* (2022.01)
(58) Field of Classification Search
   USPC ............ 310/156.07, 156.57, 156.78, 156.83,
   310/156.84
   See application file for complete search history.

(56) References Cited

U.S. PATENT DOCUMENTS

| | | | |
|---|---|---|---|
| 2012/0119604 A1* | 5/2012 | Nakayama ........... | H02K 1/2766 |
| | | | 310/156.56 |
| 2014/0077650 A1 | 3/2014 | Takahashi | |
| 2015/0372577 A1* | 12/2015 | Haussmann ....... | H02K 15/0012 |
| | | | 310/211 |
| 2017/0222505 A1* | 8/2017 | Janjic ..................... | H02K 1/246 |
| 2017/0237307 A1 | 8/2017 | Gontermann et al. | |
| 2019/0245394 A1* | 8/2019 | Takeuchi ............... | H02K 1/246 |
| 2020/0280224 A1* | 9/2020 | Huang ................... | H02K 1/246 |

FOREIGN PATENT DOCUMENTS

| | | |
|---|---|---|
| WO | 2015156353 A1 | 10/2015 |
| WO | 2016021651 A1 | 2/2016 |

OTHER PUBLICATIONS

European Patent Office, International Search Report & Written Opinion issued in corresponding Application No. PCT/EP2016/082242, dated Oct. 9, 2017, 14 pp.
Office Action issued by the EPO for application No. 16 826 326.7-1201, dated Oct. 14, 2021, 20 pages.

* cited by examiner

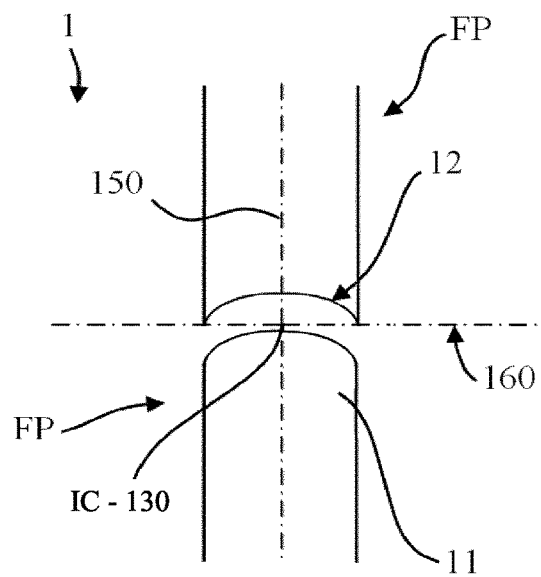
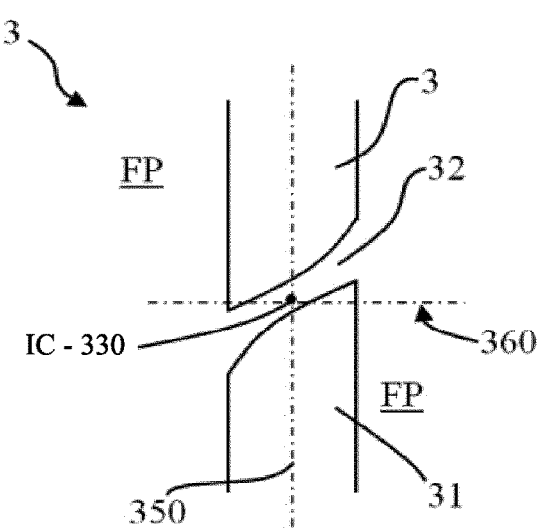
FIG. 3    FIG. 4
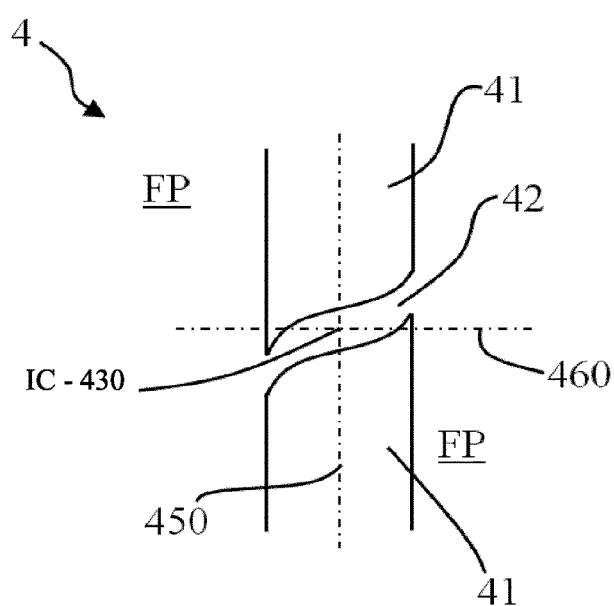
FIG. 5

ROTOR FOR ROTATING ELECTRIC MACHINES HAVING FLUX BARRIERS ARRANGED AMONG BRIDGES

The present invention relates to a rotor for a rotating machine, in particular to a rotor for a synchronous reluctance machine. More in particular, the present invention relates to a rotor for a Permanent Magnet assisted (PM-assisted) synchronous reluctance machine. Moreover, the present invention also relates to a rotating electric machine, in particular a synchronous reluctance machine, more in particular a PM-assisted synchronous reluctance machine, comprising such rotor.

Rotors for synchronous reluctance machines of known type are typically formed by a substantially cylindrical laminated stack having a plurality of magnetically conductive laminations which comprise flux conducting sections as well as flux barrier sections, thereby forming one or more pole pairs. The flux conducting sections and the flux barrier sections differ from one another to a varying degree of magnetic permeability, the section having a high magnetic conductivity being generally designated as the d-axis of the rotor, and the section having a comparably lower magnetic conductivity being designated as the q-axis of the rotor. An optimal torque yield is achieved when the d-axis has a magnetic conductivity as high as possible while the q-axis has a magnetic conductivity as low as possible. In practice, this is normally achieved by making cut-outs of proper shape in the magnetically conductive lamination along the q-axis; the cut-outs are filled with air, whereby the magnetic flux is inhibited in the direction of the q-axis and, as a consequence, the permeability decreases.

It is also known that for line-starting or direct-on-line (DOL) versions of the synchronous reluctance motors, there are solutions that foresee a squirrel cage structure buried inside the laminated stack and obtained by filling the cut-out portions of the magnetically conductive laminations with, e.g., aluminum or copper. From a manufacturing standpoint, this is normally obtained by using casting techniques, typically aluminum casting techniques, in order to create the cage structure inside the rotor core and short circuit rings at the opposite ends thereof.

Moreover, it is also known that including permanent magnets in the rotor structure can increase the efficiency and improve the power factor of the machine. The permanent magnets are normally inserted in appropriate cut-out portions of the magnetically conductive laminations.

However, there are at least two important problems that can affect the manufacturing, and ultimately the design, of PM-assisted synchronous reluctance motors.

A first problem is due to the presence of the cut out portions forming the flux barriers which somehow weaken the structure of the laminations in a greater or lesser extent, depending on the shape and size of said cut out portions.

In practice, the rotor lamination geometry of synchronous reluctance motors (either pure, PM-assisted, and/or capable of line starting) is made of so-called flux barriers and flux channels (i.e., flux conducting sections). Iron ribs, or bridges, are normally present to connect together different parts of flux channels, so as to give mechanical robustness to the rotor structure. These iron ribs are normally located around the external circumference of the rotor lamination, but some of them may be required to be located also internally, to increase mechanical robustness of the whole structure.

A further problem arises when casting techniques, in particular aluminum casting techniques, are used to create a cage structure inside the rotor core in the presence of permanent magnets. Indeed, if the permanent magnets are inserted before the aluminum casting process, there is a strong risk that they would reach temperatures above the Curie temperature, with consequent damage of their magnetic properties. In fact, for example during casting the temperature of aluminum can be as high as 600° C. and, although the permanent magnets are not in direct contact with the liquid aluminum, they could reach very high temperatures.

Moreover, if the permanent magnets are inserted before the casting process, there is also a strong risk damaging or crumbling the permanent magnets due to the thermal expansion of the iron parts of the core.

Hence, the present disclosure is aimed at providing a rotor for a rotating machine, in particular a synchronous reluctance machine, more in particular a PM-assisted synchronous reluctance machine, which allows overcoming at least some of the above mentioned shortcomings.

In particular, the present invention is aimed at providing a rotor for a rotating machine in which the mechanical strength of the rotor core-forming laminations is improved.

Furthermore, the present invention is aimed at providing a rotor for a PM-assisted synchronous reluctance machine in which permanent magnets are relatively protected from high temperatures during, e.g., aluminum casting process of a cage structure inside the rotor core.

Also, the present invention is aimed at providing a rotor for a PM-assisted synchronous reluctance machine in which permanent magnets are relatively protected from mechanical stresses during, e.g., aluminum casting process of a cage structure inside the rotor core.

Thus, in a first aspect the present invention relates to a rotor for a synchronous reluctance machine—in particular a rotor for a PM-assisted synchronous reluctance machine—comprising a rotor core having a plurality of magnetically conductive laminations stacked in a rotor axial direction; the rotor according to the invention is characterized in that said magnetically conductive laminations comprising cut-out portions forming a plurality of flux barriers FB radially alternated by flux paths FP portions, at least one of said flux barriers FB comprising a bridge connecting two flux paths FP portions adjacent to said at least one flux barrier FB, said at least one flux barrier FB having a first, barrier, mid-line which is the line that is equidistant from both sides of said at least one flux barrier FB, said bridge having a second, bridge, mid-line which is the line that is equidistant from both sides of said bridge, said first and second mid-lines intersecting at an intersection point IC, said bridge having a first symmetry axis and a second symmetry axis, said first symmetry axis being defined as the straight line tangential to said first, barrier, mid-line and passing through said intersection point, said second symmetry axis being defined as the straight line orthogonal to said first symmetry axis and passing through said intersection point, said bridge being non-symmetrical with respect to at least one of said first and second symmetry axis.

Thus, as better explained in the following description, considering the 2D cross section of a single rotor lamination sheet, one or more bridges (internal iron ribs)—according to the present invention—are defined with regard to their symmetry with respect to two orthogonal axes that can be defined related to the considered flux barrier.

Thanks to the presence of the bridges having a particular shape and symmetry, the above-mentioned problems can be avoided.

In practice, the particularly shaped bridges have the double role of ensuring the mechanical strength of the rotor structure and preserve possible magnets from high temperatures during casting process, creating a thermal buffer. The shape and the type of bending of the non-linear bridge shape can be tailored in order to optimize the strengths of the bridges against casting pressure during casting.

In particular, it was found that the thickness of the iron bridge can be significantly reduced using an arch-shape with respect to traditional straight bridges, so that also electromagnetic performance can be significantly increased. In other words, building internal bridges with a specific shape—as shown in the present disclosure—can confer additional mechanical strength, thereby allowing for example to obtain increased robustness against the high pressure needed for die-casting an aluminum cage without having to use a too large bridge thickness, which would be detrimental towards the electromagnetic performance of the motor. Different variations of the particularly shaped bridges are proposed in the following disclosure, to offer the best choice in terms of thermal protection of magnets, magnet positioning and mechanical strength, according to the required application. In particular, as better explained in the following description, different variations of the proposed solution allow to possibly insert magnets within rotor either before or after the casting process, offering to magnets a thermal protection when needed.

For the purposes of the present invention, symmetry is defined as the property of half a bridge and/or barrier to overlap the other half when mirrored with respect to one of the axes.

According to a first embodiment of the rotor according to the invention, said bridge is non-symmetrical with respect to said first symmetry axis but it is symmetrical with respect to said second symmetry axis.

In an alternative embodiment, said bridge can be symmetrical with respect to said first symmetry axis and non-symmetrical with respect to said second symmetry axis.

As a further alternative, the bridge can also be non-symmetrical with respect to both said first symmetry axis and said second symmetry axis.

As previously said, in a largely preferred embodiment of the rotor according to the invention, both sides of said bridge are substantially curved.

In general the rotor according to the present invention preferably comprises laminations in which at least one of said flux barriers FB comprises a first and a second bridge connecting two flux paths FP portions adjacent to said at least one flux barrier FB.

In this way, the first and second bridge can define an internal space in said at least one flux barrier FB, said internal space being for example aimed at housing a permanent magnet PM. This solution offers thermal protection of magnets during the casting process, if magnets are inserted before casting. The air between the bridges and the magnets acts as a thermal barrier (increased with respect to the previous variation), which can be sized according to needs.

When permanent magnets are present in the rotor according to the present invention, the internal space housing them in at least one flux barrier FB can be conveniently provided with locking means for locking the permanent magnet PM inside said at least one of said flux barriers FB.

In other words, according to this embodiment, the permanent magnets can be kept in the desired position through dedicated locks. The bridge shape is always according to symmetry requirements previously described: the insertion of the magnet lock is the only difference and does not affect the previously described shape.

According to a particular embodiment of the rotor according to the present invention, the laminations can advantageously comprise a support for said bridge. This solution allows to maximize the strength of the rotor in high speed applications, where the shaped bridges alone could not be able to withstand the centrifugal forces. In any case, the insertion of a bridge support does not modify the previously described basic shapes in terms of symmetry with respect to the identified axis.

For instance, when a support for the bridges is present, said support can conveniently comprise a first straight portion connecting a first end of said bridge with a second end of said bridge, and a second straight portion connecting an intermediate point of said first straight portion with an intermediate point of said bridge.

Other shapes for the support of the bridges are also possible according to the needs and the requirements.

Moreover, in the rotor according to the present invention at least a part of said flux barriers FB can be filled with an electrically conductive and magnetically non-conductive material (e.g. aluminum and/or a resin) creating a cage inside said rotor core.

A rotating machine, in particular a synchronous reluctance machine, more in particular a PM-assisted synchronous reluctance machine comprising a rotor according to the present disclosure, is also part of the present invention.

Further features and advantages of the present invention will be more clear from the description of preferred but not exclusive embodiments of a rotor for a rotating electric machine according to the invention, shown by way of examples in the accompanying drawings, wherein:

FIG. 3 is a view of a detail of a third embodiment of a lamination for a rotor for an electric machine according to the invention;

FIG. 4 is a view of a detail of a fourth embodiment of a lamination for a rotor for an electric machine according to the invention;

FIG. 5 is a view of a detail of a fifth embodiment of a lamination for a rotor for an electric machine according to the invention;

Figure 6:
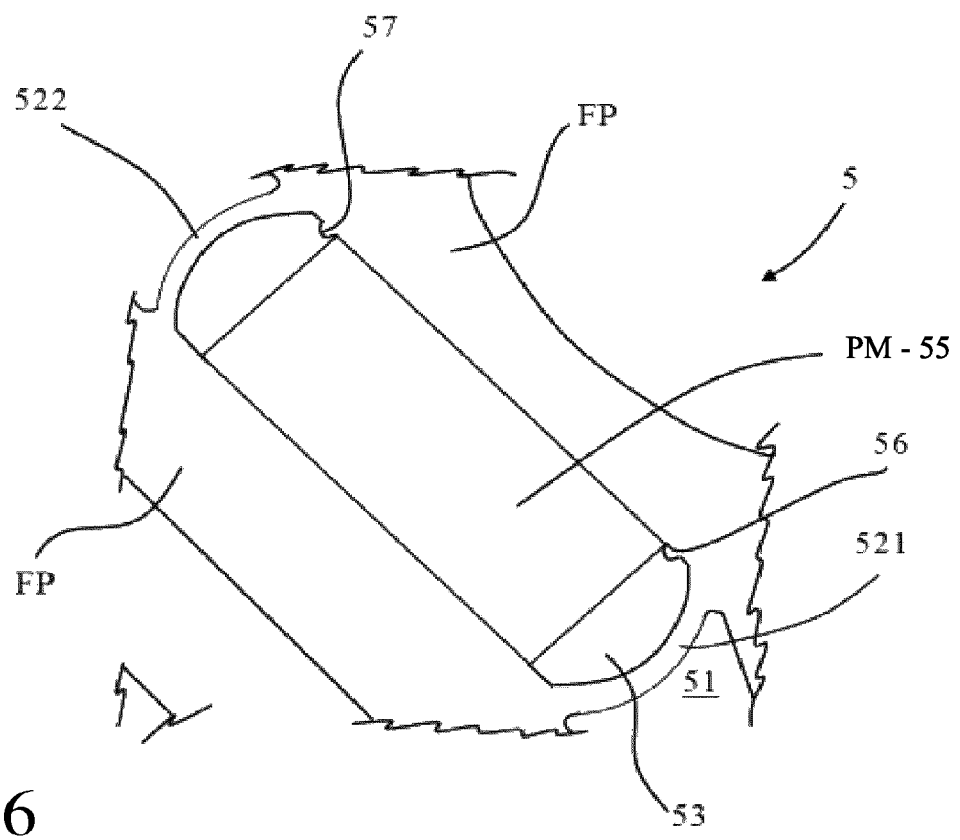
FIG. 6 is a view of a detail of a sixth embodiment of a lamination for a rotor for an electric machine according to the invention.
Figure 7:
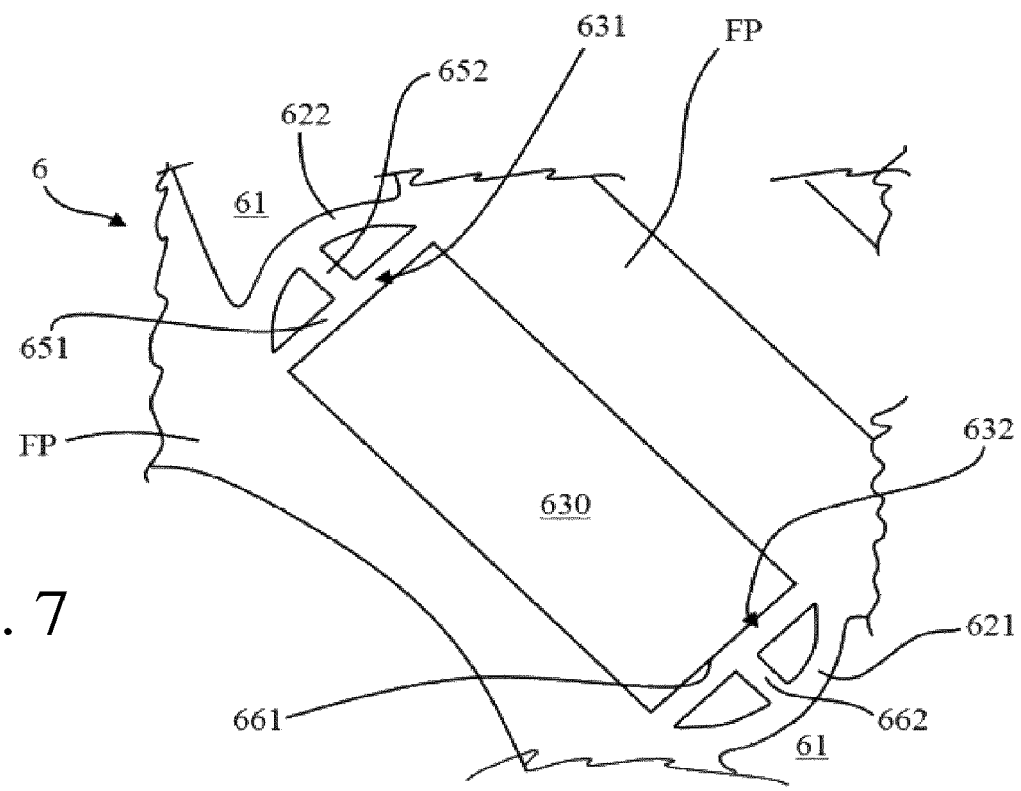

FIG. 7 is a view of a detail of a seventh embodiment of a lamination for a rotor for an electric machine according to the invention In the following detailed description and in the attached FIGS. 2-7, for sake of simplicity, the present invention will be described with reference to a detail of a lamination showing only a flux barrier FB and two adjacent flux paths FP portions. Also, in FIG. 1 a lamination for a rotor for a four poles synchronous reluctance electrical machine is shown. The same structure and principles can of course be replicated in rotors having a different number of poles and in which the laminations can have any number of flux barrier FB and flux paths FP portions, depending on the needs and the design of the machine.

With reference to the attached figures, in its more general definition, a rotor for a synchronous reluctance machine according to the present invention comprises a rotor core having a plurality of magnetically conductive laminations generally designated in the attached figure with the reference numbers 1 to 6.

According to known design principles, the magnetically conductive laminations 1, 2, 3, 4, 5, 6 are stacked in a rotor axial direction to form a rotor core and comprise cut-out portions 11, 21, 31, 41, 51, 61 forming a plurality of flux barriers FB radially alternated by flux paths FP portions.

One of the characterizing features of the rotor for a synchronous reluctance machine according to the present invention is given by the fact that at least one of said flux barriers FB comprises a bridge 12, 22, 32, 42, 521, 522, 621, 622 which connects two flux paths FP portions adjacent to said at least one flux barrier FB.

A further characterizing feature of a synchronous reluctance machine according to the present invention is given by the fact that said bridge 12, 22, 32, 42, 521, 522, 621, 622 is non-symmetrical with respect to at least one of a first 150, 250, 350, 450 and second symmetry axis 160, 260, 360, 460.

Figure 2:
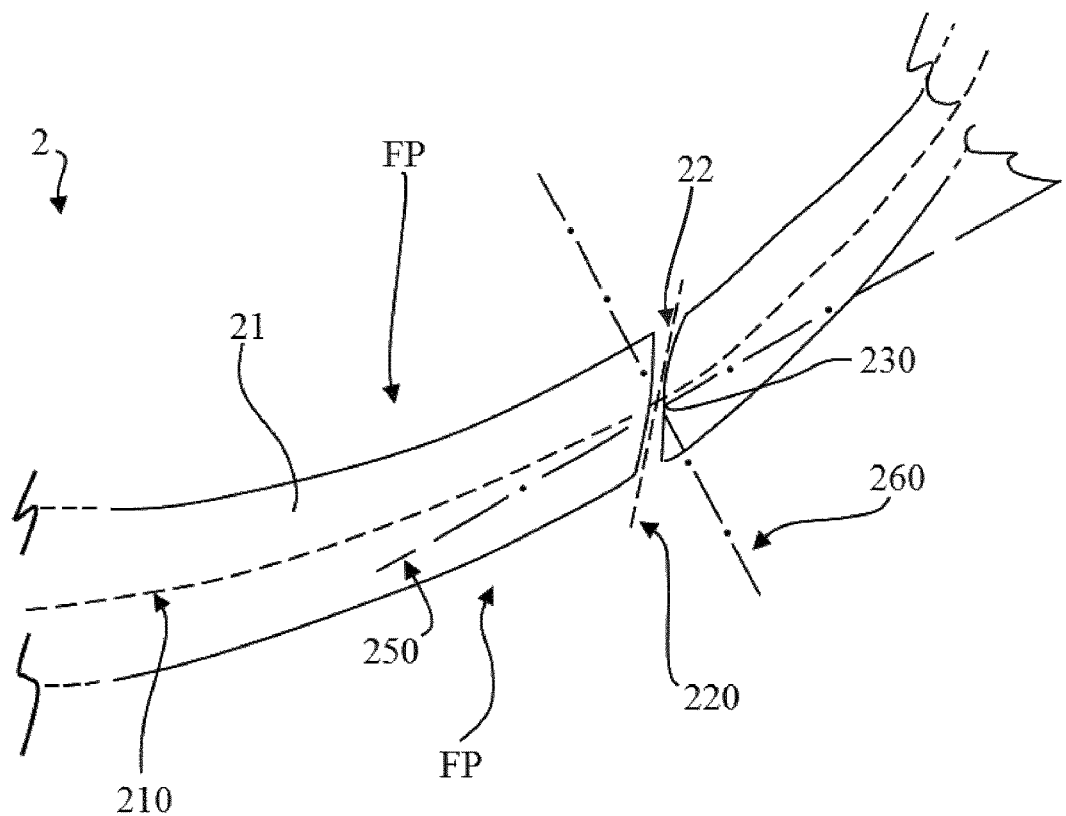
FIG. 2 is a view of a detail of a second embodiment of a lamination for a rotor for an electric machine according to the invention.

For the purposes of the present invention, the first and second symmetry axis will be now defined with reference to a lamination having the bridge configuration shown in FIG. 2. The first and second symmetry axis can be similarly defined for the laminations shown in the other figures, and in general for other laminations in which the flux barriers are provided with curved bridges.

Thus, with reference to FIG. 2, the magnetically conductive lamination 2 comprises a cut-out portion 21 forming a flux barrier FB radially alternating the flux paths FP portions. The flux barriers FB 21 comprises a bridge 22 which connects the two flux paths FP portions adjacent to said flux barrier FB 21.

As shown in FIG. 2, the flux barrier FB 21 has a first (barrier) mid-line 210 which is represented by a line that is equidistant from both sides of said at least one flux barrier 21.

Similarly, said bridge 22 has a second (bridge) mid-line 220 which is the line that is equidistant from both sides of said bridge 22, and the first 210 and second 220 mid-lines intersect each other at an intersection point IC 230.

One of the characterizing features of the rotor of the present invention is given by the fact that said bridge 22 has a first symmetry axis 250 and a second symmetry axis 260. According to the present invention, with reference to FIG. 2, the first symmetry axis 250 is defined as the straight line tangential to said first (barrier) mid-line 210 and passing through said intersection point 230, while the second symmetry axis 260 is defined as the straight line orthogonal to said first symmetry axis 250 and passing through said intersection point 230.

Thus, in a lamination for a rotor according to the present invention, the bridge 22 is non-symmetrical with respect to at least one of said first 250 and second symmetry axis 260. Specifically, with reference to FIG. 2, the bridge 22 of the embodiment shown in said figure is non-symmetrical with respect to both said first 250 and second symmetry axis 260.

In general, and considering also the other figures, the rotor of the present invention is therefore characterized in that the bridges 12, 22, 32, 42, 521, 522, 621, 622 have a first symmetry axis 150, 250, 350, 450 and a second symmetry axis 160, 260, 360, 460, and in that said bridges 12, 22, 32, 42, 521, 522, 621, 622 are non-symmetrical with respect to at least one of said first 150, 250, 350, 450 and second symmetry axis 160, 260, 360, 460.

Similarly to what explained with reference to FIG. 2, in the embodiments shown in the FIGS. 3-6, the flux barriers 11, 31 and 41 have a first (barrier) mid-line (not shown) which is considered as the line that is equidistant from both sides of the flux barrier 11, 31 and 41. Also, the bridges 12, 32 and 42 have a second (bridge) mid-line (not shown) which is considered as the line that is equidistant from both sides of the bridge 12, 32 and 42, said first (barrier) mid-line and said second (bridge) mid-line intersecting each other at the intersection points 130, 330, and 430.

Then, the first symmetry axis 150, 350, 450 are defined as the straight line tangential to the first (barrier) mid-line (not shown in FIG. 3-6, but defined in a way similar to the mid-line 210 of FIG. 2) and passing through the intersection points 130, 330 and 430, while the second symmetry axis 160, 360, and 460 are defined as the straight line orthogonal to said first symmetry axis 150, 350, and 450 and passing through said intersection point 130, 330, and 430.

With reference to FIG. 3, the bridge 12 of the embodiment shown in said figure is symmetrical with respect to said first symmetry axis 150 and non-symmetrical with respect to second symmetry axis 160. In practice, in the embodiment of FIG. 3 the half bridge on the right-hand side of the first axis 150 overlap the half bridge on the left-hand side of the axis 150 when mirrored with respect to said first axes 150, while the part of the bridge above the second axis 160 does not overlap the part of the bridge below the second axis 160 when mirrored with respect to said second axes 160.

With reference to FIG. 4 the bridge 32 of the embodiment shown in said figure is non-symmetrical with respect to both said first symmetry axis 350 and said second symmetry axis 360. In practice, in the embodiment of FIG. 4 the half bridge on the right-hand side of the first axis 350 does not overlap the half bridge on the left-hand side of the axis 350 when mirrored with respect to said first axes 350, and the part of the bridge above the second axis 360 does not overlap the part of the bridge below the second axis 360 when mirrored with respect to said second axes 360.

Similarly, with reference to FIG. 5 the bridge 42 of the embodiment shown in said figure is non-symmetrical with respect to both said first symmetry axis 450 and said second symmetry axis 460. Thus, also in the case of FIG. 5 the half bridge on the right-hand side of the first axis 450 does not overlap the half bridge on the left-hand side of the axis 450 when mirrored with respect to said first axes 450, and the part of the bridge above the second axis 460 does not overlap the part of the bridge below the second axis 460 when mirrored with respect to said second axes 460.

In general, although not shown in the attached figures, embodiments in which the bridge is non-symmetrical with respect to said first symmetry axis and symmetrical with respect to said second symmetry axis are also possible.

Preferably, as shown in the attached figures, both sides of said bridge 12, 22, 32, 42, 521, 522, 621, 622 are substantially curved. For the purposes of the present invention the substantially curved sides are those delimiting the bridge 12, 22, 32, 42, 521, 522, 621, 622 with respect to the corresponding flux barrier 11, 21, 31, 41, 51, 61.

Figure 1:
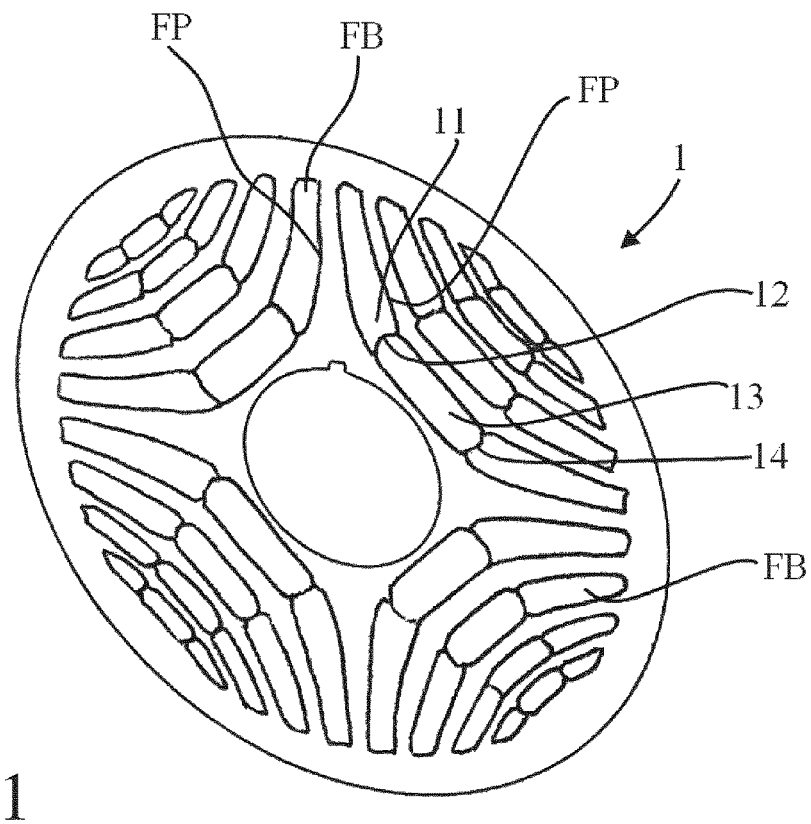
FIG. 1 is a perspective view of a first embodiment of a lamination for a rotor for an electric machine according to the invention.

In particularly preferred embodiments of the rotor according to the present invention, shown e.g. in FIGS. 1, 6 and 7, at least one of said flux barriers FB 11, 51, and 61 comprises a first 521, 621 and a second bridge 522, 622 which connect two flux paths FP portions adjacent to said at least one flux barrier 11, 51, and 61.

Thus, as shown for instance in details in FIGS. 6 and 7, in such a case the bridges 521, 522 and 621, 622 define an internal space, respectively 53 and 630, in said flux barrier FB, respectively 51 and 61.

Said internal space 53, 630 is typically aimed at housing one or more permanent magnets PM (55). As previously said, this solution offers thermal protection of magnets during the casting process, if magnets are inserted before casting. Indeed, with reference for instance to the embodiment of FIG. 6, the air between the bridges 521, 522 and the magnet 55 acts as a thermal barrier (increased with respect to the previous variation), which can be sized according to needs.

With reference to FIGS. 6 and 7, when permanent magnets are present in the rotor, in a particular embodiment of the rotor according to the present invention, the internal space 53, 630 in said flux barrier 51, 61 is provided locking means for locking one or more permanent magnets PM inside said flux barrier 51, 61.

For instance, with reference to FIG. 6 the internal space 53 can be conveniently provided with a first 56 and a second 57 rib spaced apart at a distance substantially corresponding to the length of the magnet 55, so that the magnet 55 is kept in place inside the internal space 53 of the flux barrier 51. Depending on the design of the rotor, other solutions for locking the magnet into place inside the flux barriers are also possible.

With reference to FIG. 7 in a particular embodiment of the rotor according to the present invention, the lamination 6 can be conveniently provided with a support for said bridge.

In particular, in correspondence of each bridge 621 and 622, the lamination 6 comprise a supporting structure 631 and 632 for the corresponding bridge, aimed at maximizing the mechanical strength of the lamination, and consequently of the rotor, for applications in which the arch-shaped bridge alone could not be able to withstand the forces, such as in high speed applications.

In the embodiment shown in FIG. 7, each support 631, 632 for the corresponding bridge 621, 622 comprises a first straight portion 651, 661 which connects a first end of the corresponding bridge 621, 622 with a second end of said bridge 621, 622. Each support 631, 632 further comprises a second straight portion 652, 662 which connects an intermediate point of said first straight portion 651, 661 with an intermediate point of the corresponding bridge 621, 622.

In this way the mechanical strength of the lamination, and consequently of the rotor, is greatly improved. The embodiment shown is just an example of possible support and reinforcing structures. Depending on the design of the rotor, other solutions for reinforcing the lamination are also possible.

A rotating machine, in particular a synchronous reluctance machine, more in particular a PM-assisted synchronous reluctance machine, comprising a rotor as described herein is also part of the present invention.

Several variations can be made to the rotor for a synchronous reluctance machine thus conceived, all falling within the scope of the attached claims. In practice, the materials used and the contingent dimensions and shapes can be any, according to requirements and to the state of the art.

The invention claimed is:

1. A rotor for a synchronous reluctance machine comprising a rotor core having a plurality of magnetically conductive laminations stacked in a rotor axial direction, wherein said magnetically conductive laminations comprise cut-out portions forming a plurality of flux barriers radially alternated by flux paths portions, at least one of said flux barriers comprising a first and a second bridge (i) connecting two flux paths portions adjacent to said at least one flux barrier and (ii) defining an internal space in said at least one flux barrier, the internal space (i) housing a permanent magnet and (ii) providing a thermal barrier to protect the permanent magnet during a casting process of the rotor, said at least one flux barrier having a first barrier mid-line which is a line that is equidistant from both sides of said at least one flux barrier, said bridge having a second bridge mid-line which is a line that is equidistant from both sides of said bridge, said first and second mid-lines intersecting at an intersection point, said bridge having a first symmetry axis and a second symmetry axis, said first symmetry axis being defined as a straight line tangential to said first barrier mid-line and passing through said intersection point, said second symmetry axis being defined as the straight line orthogonal to said first symmetry axis and passing through said intersection point, said bridge being non-symmetrical with respect to at least one of said first and second symmetry axis.

2. The rotor according to claim 1, wherein said bridge is non-symmetrical with respect to said first symmetry axis and symmetrical with respect to said second symmetry axis.

3. The rotor according to claim 2, wherein both sides of said bridge are substantially curved.

4. The rotor, according to claim 1, wherein said bridge is symmetrical with respect to said first symmetry axis and non-symmetrical with respect to said second symmetry axis.

5. The rotor according to claim 4, wherein both sides of said bridge are substantially curved.

6. The rotor according to claim 1, wherein said bridge is non-symmetrical with respect to both said first symmetry axis and said second symmetry axis.

7. The rotor according to claim 6, wherein both sides of said bridge are substantially curved.

8. The rotor according to claim 1, wherein both sides of said bridge are substantially curved.

9. The rotor according to claim 1, wherein the internal space includes air.

10. The rotor according to claim 9, wherein the air within the internal space provides the thermal barrier to protect the permanent magnet from high temperatures during the casting process of the rotor.

11. The rotor according to claim 9, wherein said internal space in said at least one flux barrier is provided dedicated locks for locking the permanent magnet inside said at least one of said flux barriers.

12. The rotor according to claim 1, wherein the internal space in said at least one flux barrier is provided dedicated locks for locking the permanent magnet inside said at least one of said flux barriers.

13. The rotor according to claim 1, further comprising a support for said bridge.

14. The rotor according to claim 13, wherein said support for said bridge comprises a first straight portion connecting a first end of said bridge with a second end of said bridge, and a second straight portion connecting an intermediate point of said first straight portion with an intermediate point of said bridge.

15. The rotor according to claim 1, wherein at least a part of said flux barriers is filled with an electrically conductive and magnetically non-conductive material creating a cage inside said rotor core.

16. A rotating machine comprising the rotor according to claim 1.

* * * * *